United States Patent [19]

Tsunoda et al.

[11] Patent Number: 5,824,353
[45] Date of Patent: Oct. 20, 1998

[54] MINERAL WATER

[75] Inventors: Kenji Tsunoda, Urawa; Kazumi Osada, Sendai, both of Japan

[73] Assignee: Taisho Pharmaceutical Co., Ltd., Tokyo, Japan

[21] Appl. No.: 849,862

[22] PCT Filed: Jan. 10, 1996

[86] PCT No.: PCT/JP96/00018

§ 371 Date: Jun. 10, 1997

§ 102(e) Date: Jun. 10, 1997

[87] PCT Pub. No.: WO96/21622

PCT Pub. Date: Jul. 18, 1996

[30] Foreign Application Priority Data

Jan. 13, 1995 [JP] Japan .................................. 7-003731

[51] Int. Cl.⁶ ........................................................ A23L 2/00
[52] U.S. Cl. ........................... 426/66; 426/74; 426/590
[58] Field of Search ................................ 426/66, 74, 590

[56] References Cited

U.S. PATENT DOCUMENTS 5,328,702 7/1994 Hatto et al. ............................... 426/66

FOREIGN PATENT DOCUMENTS

| 55-167087 | 12/1980 | Japan | ............... 426/66 |
|---|---|---|---|
| 63-145234 | 6/1988 | Japan . | |
| 5-004091 | 5/1993 | Japan . | |
| 5-228476 | 12/1993 | Japan . | |
| 6-126287 | 5/1994 | Japan . | |
| 94/06547 | 3/1994 | WIPO . | |

*Primary Examiner*—George Yeung
*Attorney, Agent, or Firm*—Sughrue, Mion, Zinn, Macpeak & Seas, PLLC

[57] ABSTRACT

The cluster water having a potassium ion concentration of 100 ppm or more and containing potassium ions, magnesium ions and calcium ions in a weight ratio of potassium ions:magnesium ions:calcium ions of 1:0.3–4.5:0.5–8.5 has small clusters on the average, which are retained stably for a very long period of time at ordinary temperature.

2 Claims, 2 Drawing Sheets

MINERAL WATER

TECHNICAL FIELD

The present invention relates to small-cluster water whose cluster (water molecule groups or hydrates) is small on the average and is retained as it is stably for a very long period of time.

In particular, the present invention relates to an improvement of the prior invention made by the present inventors and disclosed in JP-A-6-126287.

BACKGROUND ART

Water usually forms clusters (groups of molecules) consisting of a large number of molecules by hydrogen bonds, and the clusters always vary in size, depending on various conditions of a place where the water is present.

Water whose cluster is small on the average is known to be very useful physiologically and medically as follows: it tastes good because it completely gets into the taste buds (taste cells) of tongue owing to vigorous molecular motion; it gets into cells easily to activate them; it accelerates the absorption of a drug or food and drink because of its rapid absorption through a digestive tract; and it has cancer-preventive effect because it reduces the production of mutagens from the contents of intestines by controlling or activating enteric microorganisms and digestive tract tissue cells.

Well-known means for producing such small-cluster water are as follows.

A first means comprises cutting away the hydrogen bonds by exposing water to a supersonic wave to vibrate the same. A second means comprises bringing a ceramic into contact with water to allow far infrared rays emitted by the ceramic to act on the water. A third means comprises applying an electric field or a magnetic field to water.

Small-cluster water produced by any of these well-known means, however, has been disadvantageous in that it is not stable because of weak mutual binding of water molecules forming small clusters, and is restored to the former large-cluster water in several hours to several days at ordinary temperature.

Accordingly, the present inventors noted that natural springwater containing various mineral components forms smaller clusters than does ordinary water, and the inventors have already proposed the invention disclosed in JP-A-6-126287.

The invention disclosed in this reference relates to water which contains a low concentration of at least one mineral component selected from the group consisting of potassium ions, magnesium ions and calcium ions and whose cluster is so small on the average that a band width of 70 Hz or less is obtained in $^{17}$O-NMR spectrum of the water.

The small-cluster water according to the invention disclosed in the above-mentioned reference has sufficiently small clusters and can exist stably for a relatively long period of time at ordinary temperature. But, a period for which the water can exist in small-cluster state at ordinary temperature is limited to 3 years.

An object of the present invention is to improve the invention disclosed in the above-mentioned reference and provide a small-cluster water which can exist stably for a longer period of time at ordinary temperature.

DISCLOSURE OF THE INVENTION

The present inventors further investigated the above disclosed invention and consequently found that water containing three mineral components, namely, potassium ions, magnesium ions and calcium ions in a predetermined weight ratio and having a potassium ion concentration of 100 ppm or more has sufficiently smaller clusters than does ordinary water and can exist in small-cluster state stably for 3 or more years (i.e. substantially semipermanently) at ordinary temperature, whereby the present invention has been accomplished.

The small-cluster water according to the present invention is characterized by having a potassium ion concentration of 100 ppm or more and containing potassium ions, magnesium ions and calcium ions in a weight ratio of potassium ions:magnesium ions:calcium ions of 1:0.3–4.5:0.5–8.5.

The weight ratio of potassium ions, magnesium ions and calcium ions contained is preferably 1:1.8:2.9.

The small-cluster water of the present invention can easily be produced by mixing the above-mentioned metal ions with water in the above weight ratio in a proper vessel at ordinary temperature.

The above-mentioned metal ions are preferably added to water in the form of water-soluble salts usually used as food additives, preferably in the form of chlorides such as potassium chloride, magnesium chloride and calcium chloride; gluconates such as potassium gluconate, magnesium gluconate and calcium gluconate; aspartates such as potassium aspartate, magnesium aspartate and calcium aspartate; or hydroxides such as potassium hydroxide, magnesium hydroxide, calcium hydroxide.

According to the present invention, by virtue of the presence of the above-mentioned metal ions in the above weight ratio, large clusters of water molecules become small clusters on the average and the small clusters are retained stably for a very long period of time.

That is, a strong hydrogen bond is formed between each metal ion (cation) and a negatively charged oxygen atom in a water molecule and, in cooperation with characteristics of the metal ion, produces small-cluster water which is stable for a very long period of time.

The band width of a resonance signal in NMR measurement is inversely proportional to a time required for an objective atomic nucleus which has absorbed energy, to liberate the energy (relaxation time). Therefore, the rapider the motion of an objective molecule, the longer the relaxation time. Accordingly, a decrease in the band width of the signal indicates vigorous motion of the molecule.

That is, it is understood that in proportion as clusters of water become smaller on the average, the molecular motion becomes more vigorous, resulting in a smaller band width of the signal.

The band width in $^{17}$O-NMR spectrum is usually 80 Hz or more for tap water obtained from underground water, and about 120 Hz for tap water obtained by purifying river water or ordinary waste water (a journal, "Shokuhin To Kaihatsu", Vol. 24, No. 7, 1991, p. 83).

By contrast, according to the present invention, there can be obtained small-cluster water which gives a band width of 70 Hz or less in $^{17}$O-NMR spectrum and retains small clusters of water molecules stably for a period much longer than 3 years.

Preferably, according to the small-cluster water wherein the weight ratio of potassium ions, magnesium ions and calcium ions contained is 1:1.8:2.9, there can be obtained small-cluster water which gives the smallest band width in $^{17}$O-NMR spectrum.

BEST MODE FOR CARRYING OUT THE INVENTION

EXAMPLE 1

Potassium chloride, magnesium chloride and calcium chloride were mixed with pure water in a predetermined vessel (not shown). Thus, there were prepared aqueous solution samples having a concentration of potassium ions of 100 ppm and containing the other metal ions in various weight ratios to the potassium ions. Each sample was subjected to $^{17}$O-NMR measurement.

Figure 1:
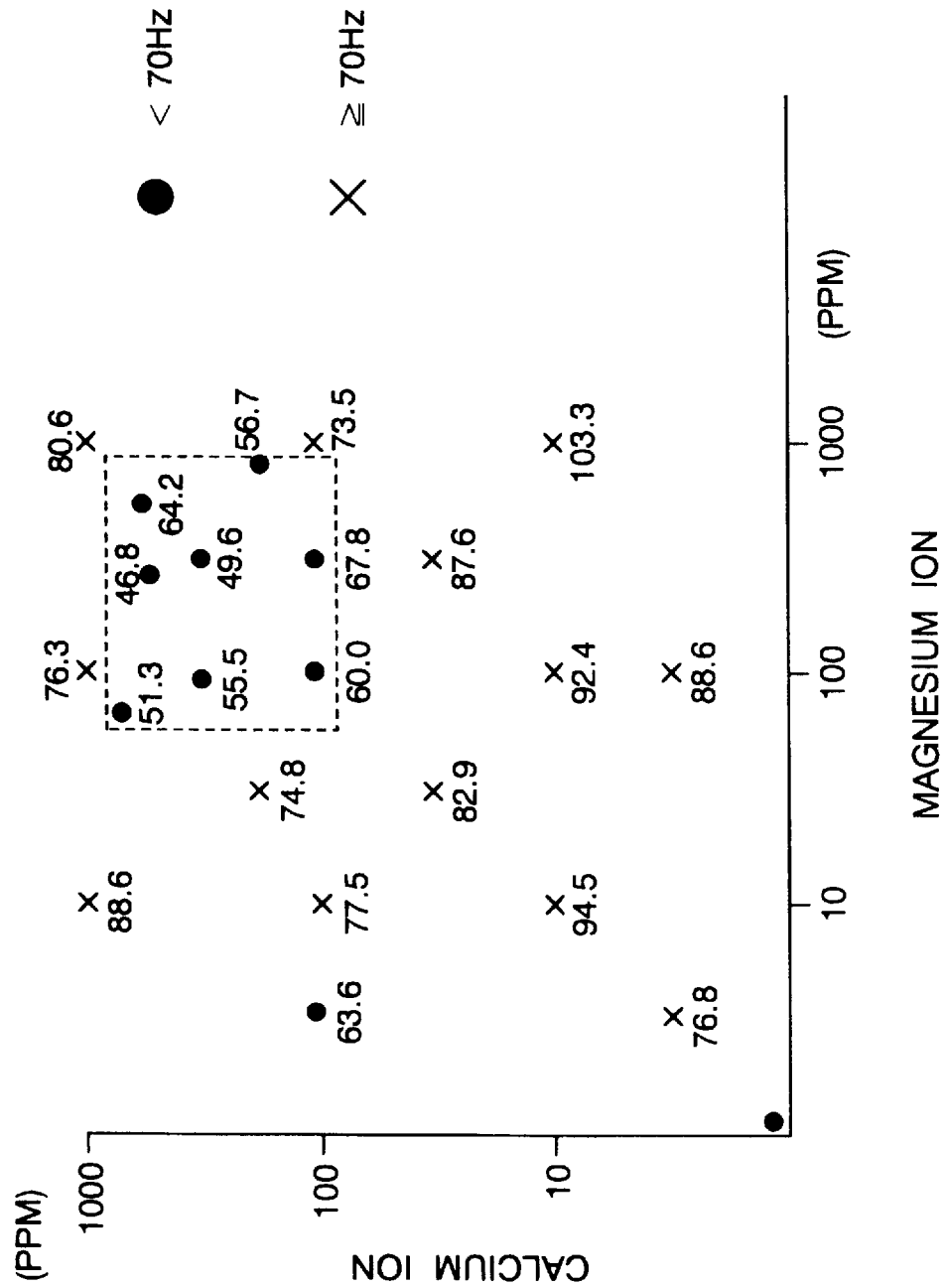
FIG. 1 is a graph showing the results of $^{17}$O-NMR measurement for aqueous solution samples containing potassium ions (with a specific concentration of 100 ppm), magnesium ions and calcium ions in each of various weight ratios.

According to the results shown in FIG. 1, the aqueous solution samples containing the metal ions in the weight ratio, potassium ions:magnesium ions:calcium ions= 1:0.3–4.5:0.5–8.5 gave a band width of 70 Hz or less in $^{17}$O-NMR spectra.

In particular, the aqueous solution sample containing potassium ions, magnesium ions and calcium ions in a weight ratio of 1:1.8:2.9 gave the smallest band width (46.8 Hz) in $^{17}$O-NMR spectra.

In addition to the above-mentioned samples, there were prepared aqueous solution samples having a concentration of potassium ions of 500 ppm, 1,000 ppm or 1,500 ppm and containing the other metal ions in various weight ratios to the potassium ions, and NMR measurement was carried out as in the above to obtain substantially the same results as shown in FIG. 1.

EXAMPLE 2

There were prepared aqueous solution samples having the following weight ratio of the metal ions; potassium ions- :magnesium ions:calcium ions=1:1.2:2.9, and having a potassium ion concentration of 10 ppm, 50 ppm, 100 ppm, 200 ppm, 400 ppm or 1,000 ppm.

Each sample was stored at ordinary temperature and continuously subjected to $^{17}$O-NMR measurement, and the change with time of the measurement result was observed for 5 years.

Figure 2:
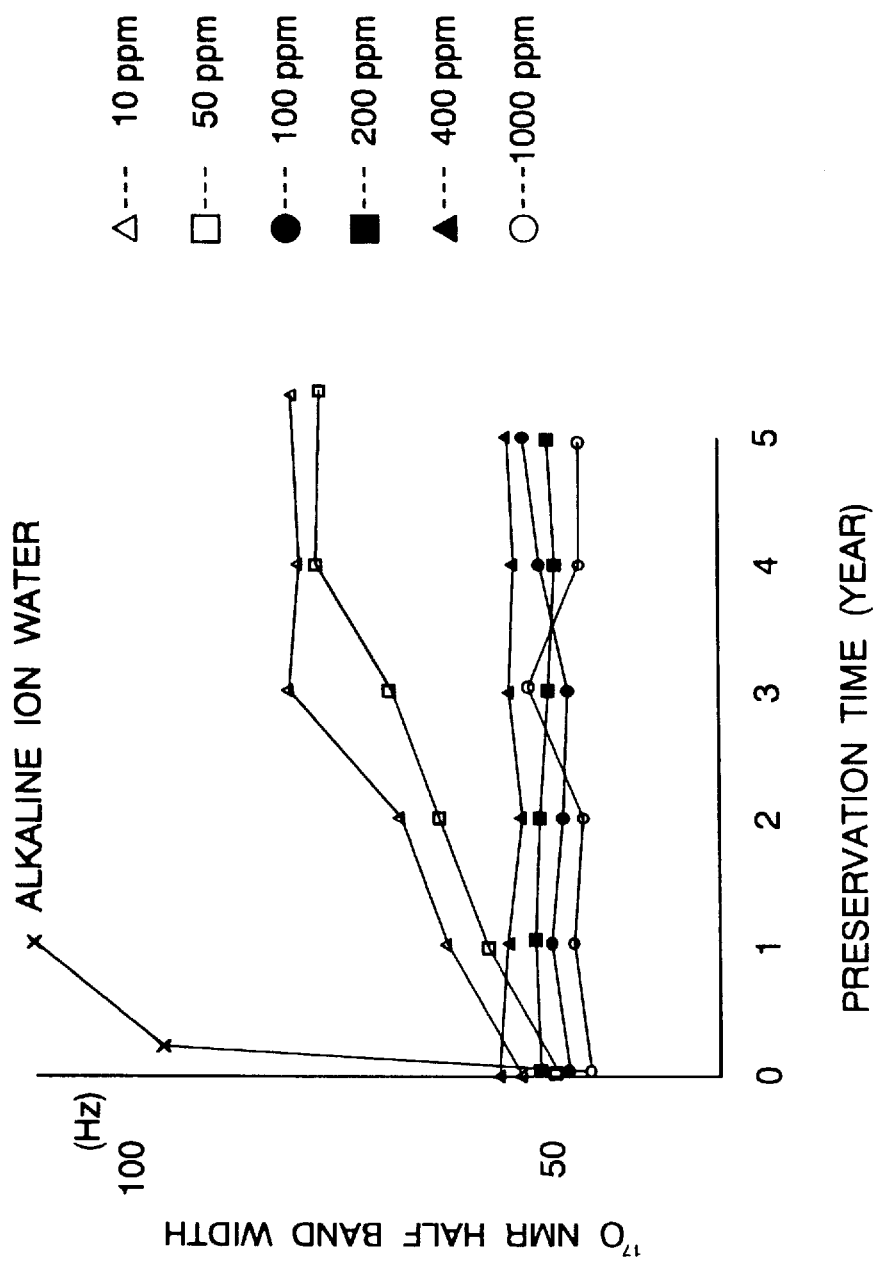
FIG. 2 is a graph showing the change with time of the results of $^{17}$O-NMR measurement for aqueous solution samples containing potassium ions (10, 50, 100, 200, 400 or 1,000 ppm), magnesium ions and calcium ions in a specific weight ratio.

According to the results shown in FIG. 2, all the aqueous solution samples retained a state of small-cluster water capable of giving a band width of 70 Hz or less in the above-mentioned measurement, until the lapse of 2 years.

But, in the case of each aqueous solution sample having a potassium ion concentration of less than 100 ppm, the band width in the above-mentioned measurement increased gradually with time and exceeded 70 Hz after the lapse of 3 years. By contrast, each aqueous solution sample having a potassium ion concentration of 100 ppm or more substantially maintained the initial band width even after the lapse of 5 years.

EXAMPLE 3

There were prepared aqueous solution samples having each of the following weight ratios of the metal ions; potassium ions:magnesium ions:calcium ions=1:0.3:0.5 and potassium ions:magnesium ions:calcium ions=1:4.5:8.5, and having a potassium ion concentration of 10 ppm, 50 ppm, 100 ppm, 200 ppm, 400 ppm or 1,000 ppm.

These aqueous solution samples were subjected to the same measurement and observation of the change with time as described in Example 2. Of the former samples, each aqueous solution sample having a potassium ion concentration of 100 ppm or more substantially maintained the initial band width (70 Hz or less) even after the lapse of 5 years, in substantially the same manner as in FIG. 2.

From the above results, it was found that an aqueous solution having a potassium ion concentration of 100 ppm or more and containing potassium ions, magnesium ions and calcium ions in a weight ratio of potassium ions:magnesium ions:calcium ions of 1:0.3–4.5:0.5–8.5 forms small-cluster water which gives a band width of 70 Hz or less in $^{17}$O-NMR spectrum and retains small clusters for at least 5 years.

According to the present invention, there can be obtained small-cluster water which gives a band width of 70 Hz or less in $_{17}$O-NMR spectrum and retains small clusters of water molecules stably for a period much longer than 3 years and preferably, small-cluster water which gives the smallest band width in $^{17}$O-NMR spectrum.

We claim:

1. A mineral water having a potassium ion concentration of 100 ppm or more and containing potassium ions, magnesium ions and calcium ions in a weight ratio of potassium ions:magnesium ions:calcium ions of 1:0.3–4.5:0.5–8.5.

2. The mineral water according to claim 1, wherein the weight ratio of potassium ions, magnesium ions and calcium ions is 1:1.8:2.9.

* * * * *